Patented June 18, 1940

2,205,076

UNITED STATES PATENT OFFICE 2,205,076

PREPARATION OF LONG-CHAIN ALIPHATIC MONONITRILES

Charles G. Wortz, Wilmington, Del., assignor to E. I. du Pont de Nemours & Company, Wilmington, Del., a corporation of Delaware No Drawing. Application November 6, 1937, Serial No. 173,196

6 Claims. (Cl. 260—404)

This invention relates to a catalytic process and, more particularly, it relates to a catalytic process for the preparation of long-chain aliphatic mononitriles. More specifically this invention relates to an improved process whereby long-chain aliphatic monocarboxylic acids containing more than eight carbon atoms in the chain are converted to the corresponding nitriles in high yields.

The long-chain fatty acids have long been important commercial commodities owing to their widespread occurrence in low-cost natural fats, oils, and waxes. More recently methods have been developed for the preparation of similar acids from cheap hydrocarbon waxes and petroleum oils. Both natural and synthetic long-chain fatty acids have been utilized in the manufacture of a wide variety of useful products, and among the valuable intermediates derived from long-chain fatty acids, the corresponding mononitriles are of especial interest.

Methods reported in the literature for the synthesis of long-chain nitriles are for the most part indirect, tedious, and expensive to carry out. For example, an ester can be converted to an alcohol by reduction and the alcohol to a halide by reaction with a halogen acid. By interaction of the halide with an alkali metal cyanide there is obtained a long-chain nitrile having one more carbon atom than the original acid. Nitriles having the same chain length as the acid are prepared by treating the corresponding amide with chemical dehydrating agents such as phosphorus pentoxide, phosphorus pentachloride, thionyl chloride, phosgene, benzotrichloride, and acetic anhydride. Dehydration of long-chain aldoximes with acetic anhydride is another convenient laboratory method. The development of these methods into practicable commercial processes apparently has not been given serious consideration owing to the prohibitive cost of reagents and intermediates.

It has also been proposed to prepare nitriles, particularly the lower fatty nitriles, by a process that involves passing vapor mixtures of the corresponding acids with ammonia in contact with dehydrating catalysts at extreme temperatures in the neighborhood of 500° C. (Mitchell and Reid, J. A. C. S., 53, 321 (1931).) However, Ralston in his U. S. Patent 1,991,955, discloses a process for cracking nitriles quantitatively to lower nitriles and hydrocarbon gases at temperatures ranging from 400° to 600° C. Many of Ralston's examples show the use of 500° C. From this one would infer that nitriles having the same chain length as the original acid could not be prepared at temperatures of about 500° C.

This invention embodies an improved continuous vapor-phase catalytic process whereby long-chain aliphatic mononitriles are produced from the corresponding monocarboxylic acids in superior yields.

An object of this invention is to prepare long-chain aliphatic mononitriles from acids of the same chain length having more than eight carbons in the chain. A further object is to provide a process for the preparation of such nitriles in superior yields. A still further object of this invention is to convert long-chain aliphatic monocarboxylic acids into nitriles of the same chain length by an improved continuous vapor-phase catalytic process. Other objects will appear hereinafter.

I have discovered that, contrary to the teaching of the prior art outlined above, high yields of long-chain aliphatic mononitriles can be obtained without degradation reactions by bringing a vaporized aliphatic monocarboxylic acid, admixed with an excess of ammonia, into contact with a dehydrating catalyst at temperatures within the range of 425° to 450° C. The preferred embodiments of the invention are illustrated in the following examples.

Example I

A vertically mounted reaction tube is charged with 90 cc. of 8 to 14 mesh silica gel catalyst and heated to a temperature of 430° to 450° C. Ammonia is passed through the hot catalyst bed at the rate of 0.4 mole per hour. Commercial stearic acid containing approximately equal parts of palmitic and stearic acids is vaporized and passed with the ammonia stream at the rate of 49 g. (0.17 mole) per hour. In traversing the catalyst bed the acids are converted smoothly to the corresponding nitriles and water. The vapor mixture issuing from the catalyst bed is condensed and collected in a suitable receiver. Two sharply defined layers are formed. The aqueous layer is separated and discarded, and the oil layer is purified by vacuum distillation. From 318 grams of acids, processed during 6.5 hours, there is obtained 242 g. of mixed stearic and palmitic nitriles, B. P. 160° to 180° C./6 mm.

Example II

Commercial stearic acid, containing both palmitic and stearic acids, is vaporized and passed at the rate of 1 pound per hour over one liter of silica gel catalyst that is maintained at 450° C.

Ammonia is passed with the acid at the rate of 4.13 moles per hour, so that the molecular ratio of ammonia to acid in the reaction tube is always about 2.5 to 1. On an average, 98% of the mixed acids is converted to a corresponding mixture of nitriles, and approximately 1% undergoes cracking reactions to form lower nitriles and gaseous hydrocarbons. The same technique may be applied to either of the pure components of commercial stearic acid to produce the corresponding nitriles in equally high yields.

Example III

Seventeen and five-tenths kilograms of the higher coconut oil acids are vaporized and passed at a uniform rate during a period of 32 hours over 1 liter of silica gel catalyst that is heated at a temperature of 429° C. Ammonia is passed with the acids at the rate of 6.3 moles per hour, so that the ammonia-acid ratio is approximately 2.4 to 1. There is produced 15.5 kg. of mixed coconut oil nitriles, corresponding to a molecular yield of 98%. In a similar manner the high molecular weight acids produced by the oxidation of paraffin wax are converted to mixtures of nitriles in high yields.

Example IV

A vertically mounted aluminum tube is charged with 1500 cc. of silica gel catalyst and one liter of small glass rings, the rings being supported above the catalyst bed on a plug of glass wool. The tube is heated to a temperature of 440° C. and a stream of ammonia passed downward at the rate of 5.1 cubic feet per hour. U. S. P. oleic acid is pumped in at the top at the rate of 1.64 pounds per hour. On coming in contact with heated glass rings the acid is vaporized and swept through the catalyst bed by the stream of ammonia. The resulting oleonitrile and water are condensed and separated. Twenty-three pounds of oleic acid is processed during 14 hours to produce 21 pounds of oleonitrile, which corresponds to 98% of the theoretical yield. The aqueous layers produced in the reaction are free from unconverted ammonium oleate, and there is no tendency to form difficultly separable emulsions with the oil layer.

The processes of this invention may be carried out profitably only within the relatively restricted temperature range from 425° C. to 450° C., and preferably between 430° C. and 440° C. At temperatures above or below this range certain complications ensue that operate to the disadvantage of the process, particularly in reference to the yield and quality of the nitrile obtained. Temperatures above 450° C. lead to serious degradation reactions whereby the hydrocarbon chain of the nitrile is "cracked" to produce volatile hydrocarbon gases, such as ethylene, propylene, etc., together with lower nitriles. If, for example, stearic acid is treated in accordance with the process of Example I, except that the catalyst is maintained at a temperature of 500° C., 86% of the starting material is converted to nitriles of lesser chain length, and an equivalent amount of volatile hydrocarbon gases is produced. The extent of this cracking reaction is directly dependent on the temperature, and it becomes negligible only at a temperature of 450° C. or below. Metallic surfaces exert a promoter effect on side reactions involving disruption of the hydrocarbon chain. It is desired to emphasize, however, that this invention is concerned only with the production of nitriles of the same chain length as the original acid, inasmuch as Letters Patents covering processes for cracking nitriles have already been granted to Ralston et al. (U. S. Patents 1,991,955 and 2,033,537).

At temperatures below 425° C. substantial amounts of the long-chain aliphatic acids of this invention will pass through the catalyst zone unchanged and appear in the product either as water-soluble ammonium salts or amides. The ammonium salts of long-chain aliphatic acids having more than 8 carbon atoms in the chain are characterized by well-defined surface-active properties, and among them are found some of the best emulsifying agents known to the art. Ammonium oleate, for example, is employed in making up cosmetic cream emulsions. Consequently, the presence of unconverted ammonium soaps in crude nitrile-water mixtures, such as are produced in the practice of this invention, leads to the formation of stable water-oil emulsions. These emulsions are troublesome to break up and necessitate the use of several additional processing steps in isolating the pure nitriles. In so doing, substantial material losses are incurred in addition to those resulting from incomplete conversion. By operating according to the preferred embodiments of this invention, at temperatures above 425° C. such complications are avoided. The acids are completely converted to nitriles, ammonium soaps are absent from the crude product, and no difficulty is experienced in separating the aqueous layer from the nitrile layer.

This invention is conveniently operated using ammonia-acid ratios of approximately 2.5 to 1. Lower ammonia ratios are in general undesirable since, in addition to the theoretical quantity required for interaction with the acid, a sufficient gas stream must be provided to sweep the reaction vapors over the catalyst bed. An inert gas such as nitrogen may be used to augment the ammonia stream, but it is usually preferable to use pure ammonia because of its favorable mass effect. Excess ammonia can be recycled in the process. The use of higher ammonia ratios has little effect other than to reduce the time that the reaction vapors are in contact with the catalyst. The contact time, which is defined as the time in seconds required by the gaseous reactants to traverse the entire volume of the catalyst at the temperature and pressure of the reaction, is likewise an important variable. The time of contact is dependent not only on the temperature and pressure, but on the catalyst volume and rate of gas flow. In the practice of this invention those values are adjusted so that the contact time is within the range from about 2 to about 20 seconds and preferably from 5 to 10 seconds.

The dehydrating catalysts of this invention are derived from elements selected from the group comprising the 3d, 4th, 5th, 6th, and 8th groups of the periodic table. For example, the dehydrating oxides of aluminum, thorium, silicon, vanadium, molybdenum, titanium, and tungsten are especially suitable. These oxides are preferably employed in the form of hard, porous, non-crystalline gels. Dehydrating salts such as alums, basic aluminum salts, and the like, may also be used. It is preferred to use a highly purified silica gel catalyst such as may be prepared by neutralizing sodium silicate, or by the hydrolysis of silicon halides or esters of orthosilicic acid. Silica gel catalyst is characterized by a high degree of activity in promoting the formation of nitriles from acids. It is unusually long-lived, and when spent, it may be restored to its original activity by burning off carbonaceous deposits in a stream of oxygen-containing gas at elevated temperatures. This revivifying process can be carried out either in situ or in a separate muffle furnace. Regenerated catalysts are indistinguishable from fresh catalysts both in activity and appearance. Naturally occurring gels such as indianaite, doucil, Japanese acid clay and zeolite are usually inferior to the highly purified synthetic products.

On a commercial scale the processes of this invention are best carried out in suitable metallic equipment. Glass and other ceramic materials are satisfactory in the laboratory but are impracticable for use on a large scale. Moreover, it has been found that certain metals and alloys are not entirely satisfactory. Iron and many of its alloys promote undesirable side reactions such as the cracking reaction mentioned above. Aluminum and its alloys exert no unfavorable wall effect but are subject to corrosion. Equipment for the conversion of long-chain aliphatic acids to nitriles is preferably constructed of pure nickel.

As starting materials in the reaction, long-chain aliphatic monocarboxylic acids having more than 8 carbon atoms in the chain may be employed. Among these might be mentioned the pure fatty acids such as capric, lauric, myristic, palmitic, oleic, linoleic acids, and the like. There may also be used mixtures of long-chain aliphatic acids such as are obtained from naturally occurring fats; namely, palm oil, coconut oil, arachis oil, lard, and tallow. Mixtures of acids prepared synthetically from paraffin wax and petroleum oils are likewise converted to nitriles with ease. Individual pure nitriles can be separated from mixtures of nitriles by careful fractionation. Broadly speaking, all of the acids coming within the scope of this invention are characterized by the surface-active properties of their alkali metal and ammonium salts.

It is readily apparent that this process for the production of long-chain aliphatic mononitriles from aliphatic monocarboxylic acids offers many advantages over methods from the prior art. It comprises an efficient catalytic process that can be operated continuously. Side reactions involving the disruption of the hydrocarbon chain of the nitrile are avoided, and the process can be operated on any scale commensurate with the requirements for any particular long-chain nitrile or mixture of nitriles. The long-chain mononitriles of this invention are valuable articles of commerce. They are particularly useful as intermediates in the preparation of insecticides, resins, wetting agents, gelling agents for wax emulsions, etc. They may be hydrogenated to valuable aliphatic amines by subjecting them to catalytic hydrogenation at temperatures within the range of 25° to 200° C. and at superatmospheric pressures, using a nickel catalyst as described in the copending application Serial No. 49,553 of G. D. Graves, filed November 13, 1935.

Having set forth the preferred embodiments of this invention, it is to be understood that said invention is not to be limited to the specific embodiments thereof except as defined in the following claims.

I claim:

1. A process for the preparation of aliphatic mononitriles which comprises bringing a member of the group consisting of an unsubstituted fatty acid having at least eight carbon atoms per molecule, its corresponding anhydride, ester, ammonium salt, and amide, in the vapor phase, together with an excess of ammonia into contact with a dehydrating catalyst at a temperature between 425° and 450° C. said reaction being further characterized in that it is carried out in a catalytic chamber constructed so as to have an inner surface of a catalytically inactive material.

2. The process in accordance with claim 1 characterized in that the dehydrating catalyst is silica gel.

3. A process for the preparation of aliphatic mononitriles which comprises bringing a member of the group consisting of an unsubstituted fatty acid having at least 8 carbon atoms per molecule, its corresponding anhydride, ester, ammonium salt, and amide in the vapor phase together with an excess of ammonia into contact with a dehydrating catalyst at a temperature between 425° C. and 450° C., said reaction being further characterized in that it is carried out in a catalytic chamber constructed so as to have an inner surface of metallic nickel.

4. A process for the preparation of aliphatic mononitriles which comprises bringing a member of the group consisting of an unsubstituted fatty acid having at least eight carbon atoms per molecule, its corresponding anhydride, ester, ammonium salt, and amide, in the vapor phase, together with an excess of ammonia into contact with a dehydrating catalyst at a temperature between 425° and 450° C., said reaction being further characterized in that it is carried out in a catalytic chamber constructed so as to have an inner surface of metallic aluminum.

5. A process for the preparation of an aliphatic mononitrile which comprises bringing lauric acid in the vapor phase, together with an excess of ammonia, into contact with a dehydrating catalyst at a temperature between 425° and 450° C., said reaction being further characterized in that it is carried out in a catalytic chamber constructed so as to have an inner surface of a catalytically inactive material.

6. The process for the preparation of aliphatic mononitriles which comprises bringing an unsubstituted fatty acid having 18 carbon atoms in the vapor phase, together with an excess of ammonia, into contact with a dehydrating catalyst at a temperature between 425° and 450° C., said reaction being further characterized in that it is carried out in a catalytic chamber constructed so as to have an inner surface of a catalytically inactive material.

CHARLES G. WORTZ.